March 30, 1954 — W. A. McNULTY — 2,673,435
WALKING-TYPE GANG LAWN MOWER
Filed Jan. 27, 1950 — 2 Sheets-Sheet 1

INVENTOR,
Walter A. McNulty
BY Charles Shepard
HIS ATTORNEY

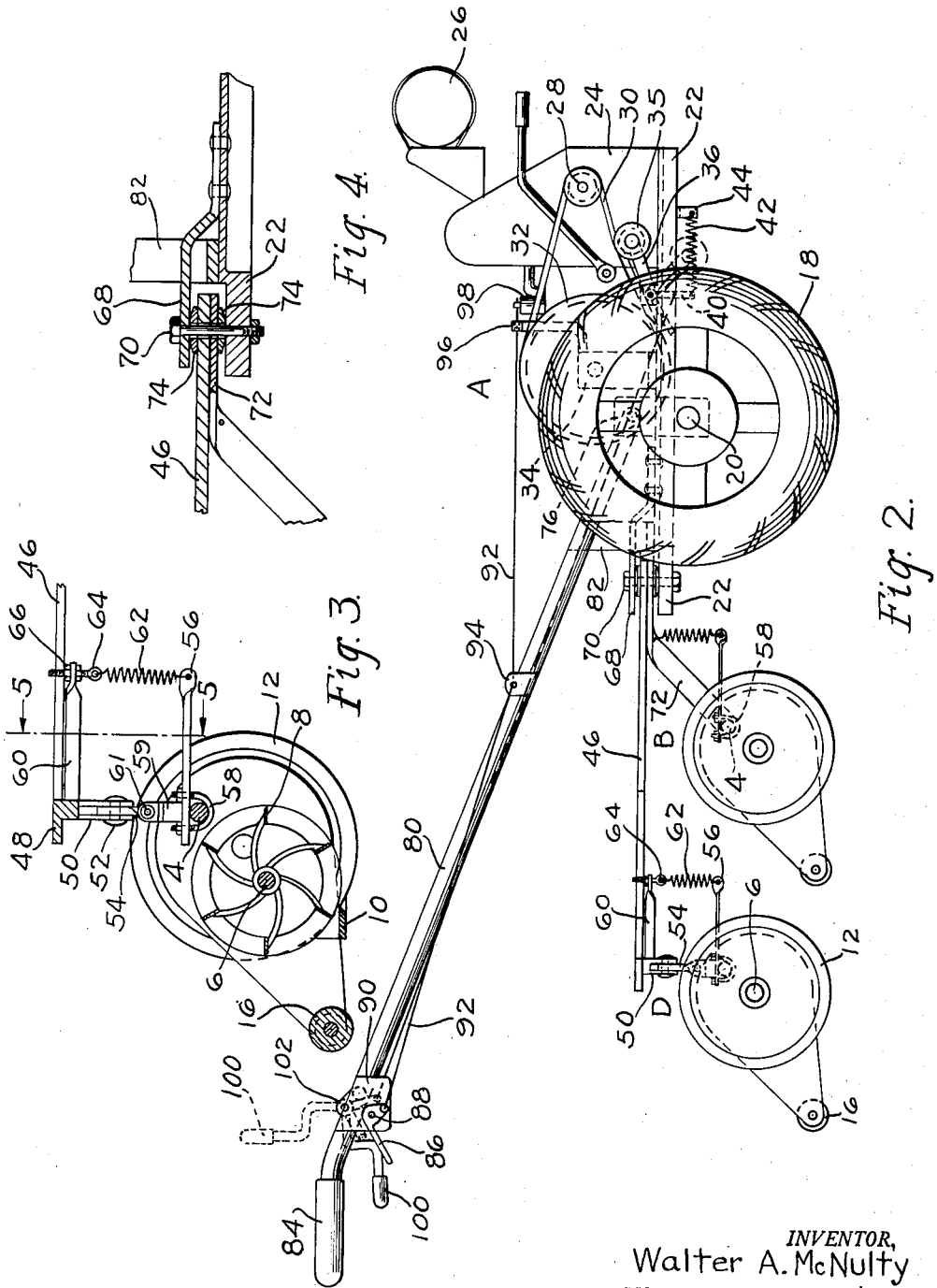

Patented Mar. 30, 1954

2,673,435

UNITED STATES PATENT OFFICE 2,673,435

WALKING-TYPE GANG LAWN MOWER

Walter A. McNulty, Fairport, N. Y.

Application January 27, 1950, Serial No. 140,858

5 Claims. (Cl. 56—7)

The present invention relates to lawn mowers and more particularly to mower assemblies of the multiple type, and it has for its object to provide a light, simple, and readily wieldable gang mower of the "walking" type that can be more easily transported bodily and may be stored in the relatively small spaces ordinarily available to householders.

There is quite a definite class of lawns that are too small for justifiable or convenient use of a usual horse drawn or tractor mower and yet too large for other than burdensome cutting with the ordinary hand mower, powered or not. In the first instance, also, the presence of numerous trees presents obstacles to their use as short turns are difficult to manage and fringes of uncut grass are left for subsequent trimming.

An object of this invention, therefore, is to provide a mower that will approach the capacity of the larger machine while retaining the maneuverability of the hand machine so that short turns may be made around trees and shrubs.

A further object is to distribute and dispose the units of a walking gang mower that they will effectively track in relation to each other and the cutters will always overlap their respective swaths.

Another object is to provide a simple spring action that will yieldably maintain the trail roller of each cutting unit on the ground and resist the cutter frame in its tendency to swing upwardly on the axis of the ground wheels.

These and other objects are accomplished by the construction disclosed as an illustrative embodiment of the invention in the following description and in the accompanying drawings forming a part hereof, in which:

Fig. 2 is a side view thereof;

Fig. 3 is an enlarged, vertical, detail section through one of the rear mower units on the line 3—3 of Fig. 1 showing in side elevation its attachment to the main frame;

Fig. 4 is an enlarged, vertical, fragmentary section through the hitch taken substantially on the line 4—4 of Fig. 1.

The same reference numerals throughout the several views indicate the same parts.

Figures 1, 5:
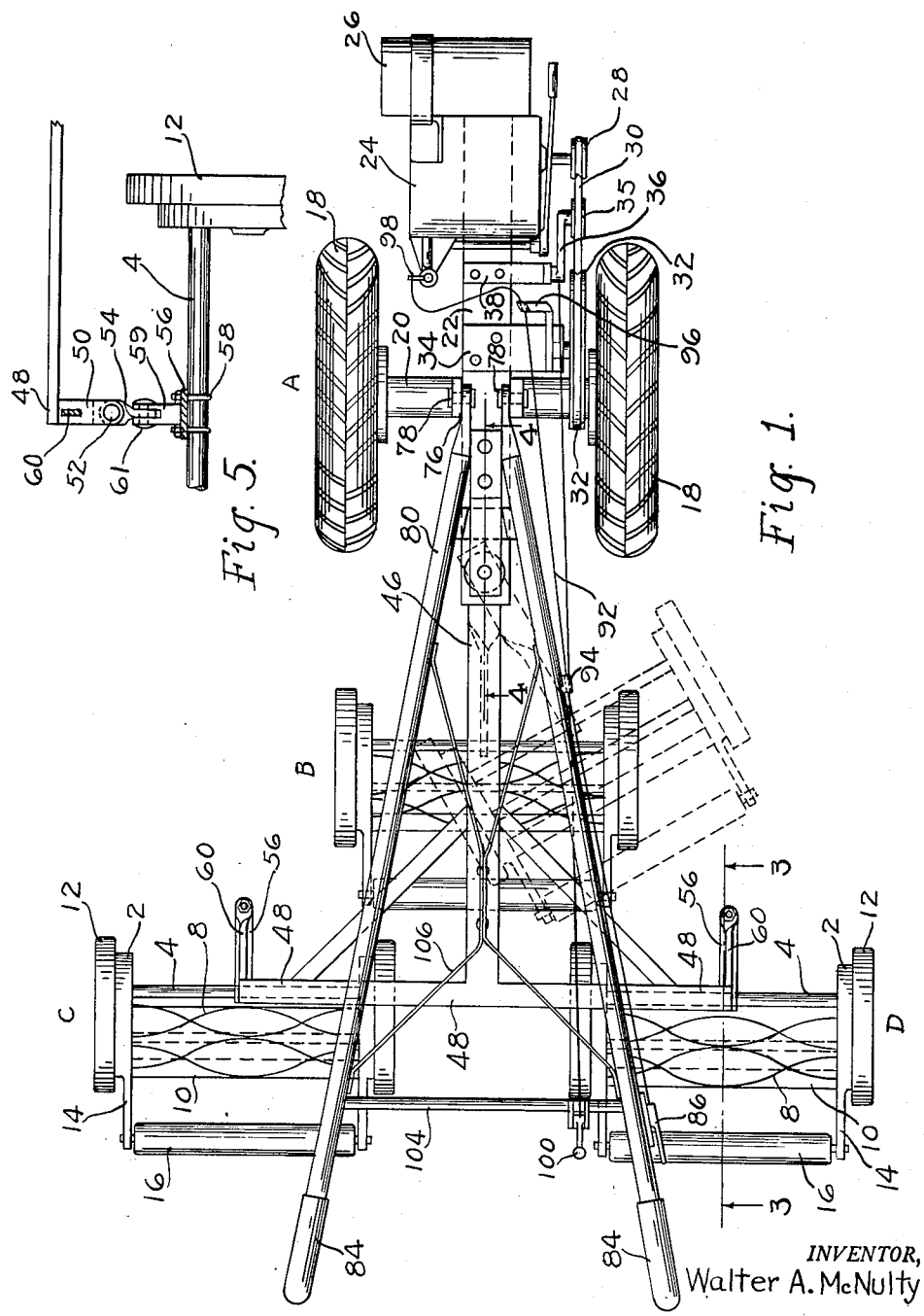
Fig. 1 is a top plan view of a gang lawn mower constructed in accordance with and illustrating one embodiment of the invention.
Fig. 5 is a detail vertical section taken substantially on the line 5—5 of Fig. 3.

Referring more particularly to the drawings, the major elements of the machine comprise an automotive advance power unit A, a lead rotary mower unit B of approximately the same thread gage, and a pair of rear rotary mower units, C and D, that are substantial duplications of the unit B. In fact all of the three mower units are internally and individually the conventional hand mower in everyday use (minus a handle) and include each a frame 2 including a cross bar 4 and in which is journaled a blade shaft 6 carrying blades 8 that strike a shearing plate 10 at the bottom of the frame. The shaft is driven by the ground wheels 12 through suitable gearing (not shown) of any preferred kind. Rearward arms 14 in the frame provide journals for the usual trailing ground roller 16 that maintains the shearing plate 10 at the proper elevation.

Returning to the advance power unit A, the ground and driving wheels 18 thereof are higher or of greater diameter than the mower wheels and their axle 20 supports a front-to-rear frame 22 on the forward portion of which is mounted an engine or motor 24, in the present instance, an internal combustion gas engine the fuel tank of which is indicated at 26. This need be only briefly described as its exact nature is not specifically important. Its power take-off pulley 28 is connected by a belt 30 with a driven pulley 32 turning in a bracket 34 on the main frame 22, which pulley 32, through suitable transmission (not shown), drives the shaft 20 of the ground wheels. Instead of a clutch between the engine and axle it is preferred to use a belt tightener which, when released, allows the belt to slip idly on its pulley. This consists, in the present showing, of a jockey pulley 35 swinging on a bell crank arm 36 having a bearing in a bracket 38 on the frame 22. The other arm 40 of the bell crank is attached to a tension spring 42 that reacts against an attaching post 44 on the main frame 22. This spring normally holds or at least tends to hold the jockey pulley against the lower reach of the belt 30 in the position shown, which is the driving position.

Hitched to the rear end of frame 22 is the stem 46 of a T-shaped draw bar 48. At each end of the cross bar thereof is a dependent rigid bearing fork 50 (best shown in Figs. 3 and 5).

A forwardly extending arm 56 rests on the center of the frame bar 4 of each adjacent rear mower unit C, D. The arm is held fixedly to the bar by a yoke 58 embracing the bar and bolted to the arm and extending upwardly from the latter between the arms of the yoke is an integral bearing fork 59 carrying a pivot 61. A twisted shackle link 54, that is, one end thereof having one eye turned 90° from the other, connects the forks 50 and 59 by means of pivot pins 52 and 61 so that both a forward and rearward and a side to side rocking joint is provided between the mower unit and the cross arm of the draw bar.

The ends of the cross bar 48 are also provided with rigid arms 60 extending forwardly coincidentally with the arms 56 and directly above them. Tension springs 62 connect the two arms 56 and 60 in each instance at a substantial distance forwardly from the frame bar 4, their attachment to the top rigid arms 60 being by means of eye bolts 64 with a pair of nuts 66 above and below the arms as a means of adjusting the tensions of the springs. The following results accrue from these last described arrangements.

The rear mower units C and D are held in alinement with each other so far as the transverse vertical plane extending along their axes 6 is concerned, yet they may tilt individually in that plane on pivots 52 to conform with transverse inequalities in the ground. The trail rollers 16 are resiliently held by springs 62 against rotating upwardly on the ground wheel axles as a center when the ground wheels meet great driving resistance through the blades encountering a heavy cut or the wheels encountering a difficult traction surface. Yet, by rocking forwardly and rearwardly on the pivot 61 of the shackle link 54, the units as a whole may also successfully meet rolling ground in a forward direction. Aside from these relative movements a fixed relationship for draft purposes is established between the draw bar 46, 48 and the two rear mowing units C, D.

The manner in which the draw bar tongue 46 is hitched to the frame 22 of the power unit A is best shown in Figs. 2 and 4. The tip of the bar is confined between the rear of the frame and a keeper tongue 68 on the latter by a king bolt 70 on which it and hence the rear mower units C, D may swing in a wide arc or, conversely, the power unit A may turn abruptly to right or left with reference to the draw bar tongue in changing direction.

The lead mower unit B is coupled to the same hitch for which purpose there is secured to its frame bar 4 by a yoke 58 and arm 56 with spring 62, an upwardly and forwardly extending tongue 72, the tip of which also is confined by the keeper plate 68 beneath draw bar tongue 46 to turn independently on king bolt 70 on a shorter radius as indicated in dotted lines in Fig. 1. A pair of dome washers 74 on the bolt on both sides of the attached tongues permit a slight rocking movement between the latter and the power unit frame to avoid a too stiff and rigid draft connection for which purpose, also, the openings in the washers, the draw bar stem 46, and the tongue 72 are all oversize with respect to the diameter of the bolt 70 as appears in Fig. 4.

The steering arrangements, so important to the broader concept of this invention will now be described.

Directly above the power unit axle 20 on frame 22 are a pair of upstanding rigid arms 76 between which are secured by pins 78 the forward tips of a pair of rearwardly diverging rigid handles 80 further attached to the frame just forwardly of the mower tongue hitch 70 by another yoke brace 82. The handles terminate in a pair of hand grips 84 which extend to a point in rear of the rear mower units C, D or at least to a point in the region of the walking enlarged by the distance between these units so that they may be conveniently gripped and manipulated by the operator walking behind the machine as a whole. A throttle lever 86 pivoted at 88 to a bracket 90 on one of the handles is connected by a wire 92 running through eyes 94 and 96 to a carbureter 98 on the engine 24, which affords the customary engine control while another lever 100 pivoted at 102 on the same bracket and having the "off" position shown in dotted lines controls the position of the before described jockey pulley 35 that affects the transmission being connected to the pulley arm 36. Framework elements 104 and 106 brace the handles 80 to form a single element.

In operation, the operator, walking in rear of the machine, grasps the hand grips 84 and steers the power unit A with the mowing units C, D trailing overlapping swaths. When a turn is made, say to the left, the advance unit B, with its shorter tongue 72 responds first on a relatively small arc to the position shown in dotted lines in Fig. 1, or approximately so. Then the other two units turn together, the unit D traveling farther and faster on the left ground wheel of the unit C as an approximate center and as the power unit can be directed almost at right angles because of its size and close coupling a most abrupt and sharp turn is made possible. It is to be further noted that the hand grips and hence the walking operator will clear the outside ground wheel of either rear unit C, D in the extreme turning positions of him and the machine.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. In a gang lawn mower, the combination with a lead power unit having ground wheels, of at least three trailing mowing units having blade driving ground wheels and all directly pivotally connected with the power unit to swing horizontally relatively thereto, two of said mowing units being completely independent of a third relatively forward unit but axially alined with one another and normally parallel to the axis of a third relatively forward unit, and a steering and control handle fixed to the power unit and extending rearwardly of the rearmost mowing unit to be accessible to an operator walking behind the latter.

2. A gang lawn mower in accordance with claim 1 further characterized by the fact that one of the mower units is normally centrally arranged in line behind the power unit, that an individual tongue is provided directly connecting it with a pivot on the latter, that a T-shaped draw bar is provided having its tongue portion hitched on the same pivot, and two of the mower units, axially spaced from each other, are connected to the cross piece of the draw bar in rear of the central unit with the axes of their ground wheels substantially alined with each other and in parallelism with that of the central forward unit.

3. A gang lawn mower in accordance with claim 1 in which a single forward mower unit normally directly behind the power unit is pivotally hitched to the power unit by means of an individual tongue independent of and movable relatively to the other units and the gage of the ground wheels of the power unit is substantially the same as that of the mower unit.

4. A gang lawn mower in accordance with claim 3 in which two of the mower units are arranged in axial alinement with each other and spaced from each other along that axis in rear of the forward mower unit, and the median line of the handle bisects said space when the mower as a whole is proceeding straight forward.

5. In a lawn mower the combination with a draft appliance and a mowing unit having blade driving ground wheels, of a shackle link connecting the mowing unit with the draft appliance, one eye of which is pivoted to one of said elements to permit rocking in a forwardly and rearwardly direction between the two and the other of which permits a similar lateral rocking movement, said draft appliance and the mowing unit being provided, respectively with overlying lever arms extending in line with the direction of the mower's travel and the arms are connected by a spring which places a tension on the tendency of the mowing unit to turn forwardly bodily on the axis of its ground wheels.

WALTER A. McNULTY.

References Cited in the file of this patent

UNITED STATES PATENTS

| Number | Name | Date |
| --- | --- | --- |
| 1,509,468 | Braun | Sept. 23, 1924 |
| 1,512,439 | Worthington | Oct. 21, 1924 |
| 1,775,297 | Towner | Sept. 9, 1930 |
| 1,825,109 | Worthington | Sept. 29, 1931 |
| 2,299,859 | Speiser | Oct. 27, 1942 |